US005458954A

United States Patent [19]

Ogi et al.

[11] Patent Number: 5,458,954

[45] Date of Patent: Oct. 17, 1995

[54] INK TRANSFER MEDIUM FOR TONER, INK TRANSFER PROCESS AND RE-INKING PROCESS FOR THE SAME

[75] Inventors: Kenji Ogi; Hiroshi Takayama; Yasuo Yamamoto, all of Minamiashigara; Kazuo Maruyama; Eiichi Akutsu, both of Ebina, all of Japan

[73] Assignee: Fuji Xerox Co., Ltd., Tokyo, Japan

[21] Appl. No.: 314,458

[22] Filed: Sep. 28, 1994

Related U.S. Application Data

[63] Continuation of Ser. No. 907,536, Jul. 2, 1992, abandoned.

[30] Foreign Application Priority Data

Jul. 11, 1991 [JP] Japan .................................. 3-196138

[51] Int. Cl.$^{6}$ ...................................................... B32B 3/00

[52] U.S. Cl. ......................... 428/195; 428/207; 428/323; 428/327; 428/411.1; 428/480; 428/913; 428/914

[58] Field of Search .................................... 428/195, 216, 428/207, 213, 214, 323, 327, 913, 914, 480, 411.1

[56] References Cited

U.S. PATENT DOCUMENTS 5,045,382 9/1991 Akutsu et al. .......................... 428/216

FOREIGN PATENT DOCUMENTS 56-10479 2/1981 Japan .
60-259485 12/1985 Japan .
63-297084 12/1988 Japan .
1-113276 5/1989 Japan .

OTHER PUBLICATIONS

Hawley's 12th Ed. Condensed Chemical Dictionary Lewis, Sr. (p. 1160).

*Primary Examiner*—Patrick J. Ryan
*Assistant Examiner*—William A. Krynski
*Attorney, Agent, or Firm*—Oliff & Berridge

[57] ABSTRACT

An ink transfer medium for toner is disclosed, comprising the following layers, in this order: a heat-generating resistive layer heated by input of electrical signal, a conductive layer, and an ink release layer having a toner layer on it, an adhesion from 0.2 g/mm to 40 g/mm as measured by the 90° peeling off method and consisting of a viscoelastomer having a critical surface tension of 35 dyne/cm or less. It can be re-inked by attaching toner to the portions of the ink transfer medium from which the ink has been removed, using toner held in a toner holding means. An ink transfer process for toner is also disclosed, wherein an ink transfer medium having toner layer formed on the above described ink release layer is used and the toner layer contacts the recording medium under pressure, while a recording head contacts the anisotropic conductive layer of the ink transfer medium, so that an electrical signal is input and then toner fused by heat generated by the heat-generating resistive layer is transferred to the recording medium.

7 Claims, 4 Drawing Sheets

INK TRANSFER MEDIUM FOR TONER, INK TRANSFER PROCESS AND RE-INKING PROCESS FOR THE SAME

This is a Continuation of application Ser. No. 07/907,536 filed Jul. 2, 1992, now abandoned.

FIELD OF THE INVENTION

This invention relates to an ink transfer medium for toner, an ink transfer process and a re-inking process for the same.

BACKGROUND OF THE INVENTION

Conventionally, various proposals have been made for current-conducting thermal transfer recording method in which ink is transferred to a recording medium by inputting an electrical signal corresponding to an image signal to an ink transfer medium having an anisotropic conductive layer and a heat-generating resistive layer. For example, Japanese unexamined patent publications Sho 56-10479 (1981), Sho 60-259485 (1985) and Hei 1-113276 (1989) describe a printing process using an ink transfer medium having a toner layer adhering to it, which is first fused and then mechanically leveled. Japanese unexamined patent publication Sho 63-297084 (1988) describes a printing process in which toner is attached uniformly to an ink transfer medium by electrostatic force and then ink is transferred to a recording medium in a pattern corresponding to an image signal.

In the first of the above described processes in which toner is held to an ink transfer medium by heat, however, because of the use of heat, there are problems of high power consumption and in that the recording apparatus is inevitably bulky. Although toner is fused to the ink transfer medium by heat and mechanically leveled to form a thin layer, inevitably there are fine irregularities in the ink layer itself. Because of these irregularities, and also because of irregularities remaining where ink has been removed in the transfer process, and further because material properties such as electrical conductivity, dielectric constant change when the toner is fused to form a solid layer, the re-inking of the ink transfer medium is not stable. The second of the above described processes in which toner is held to the ink transfer medium by electrostatic force has problems that toner is not retained well because the retention is done only by electrostatic force. The toner tends to fall off because of vibration and the like, and this leads to problems such as background fogging.

SUMMARY OF THE INVENTION

It is an object of the present invention to provide an ink transfer medium and an ink transfer process for toner free of the defects found in the above described conventional processes.

Accordingly, it is an object of the present invention to provide an ink transfer medium for toner capable of retaining toner uniformly and reliably.

It is a further object of the present invention to provide an ink transfer process for toner capable of good image printing with the use of the above described ink transfer medium.

Additional objects and advantages of the invention will be set forth in part in the description which follows and in part will be apparent to a person with ordinary skill in the art from the description, or may be learned by practice of the invention.

This invention relates to an ink transfer medium for toner comprising the following layers, in this order: a heat-generating resistive layer heated by input of an electrical signal, a conductive layer, and an ink release layer having a toner layer on it, having an adhesion from 0.2 g/mm to 40 g/mm as measured by the 90° peeling off method and consisting of a viscoelastomer having a critical surface tension of 35 dyne/cm or less.

This invention also relates to an ink transfer process for toner in which an ink transfer medium having a toner layer formed on the above described ink release layer is used and the toner layer contacts the recording medium under pressure, while a recording head contacts the anisotropic conductive layer of the ink transfer medium so that an electrical signal is input and then toner fused by heat generated by the heat-generating resistive layer is transferred to the recording medium.

The above described ink transfer medium for toner can be re-inked by attaching toner to the portions of the ink transfer medium from which the ink has been removed, using toner held in a toner holding means.

BRIEF DESCRIPTION OF THE DRAWINGS

The manner by which the above objects and other objects, features and advantages of the present invention are attained will be fully evident from the following detailed description when it is considered in light of the accompanying drawings, wherein.

DETAILED DESCRIPTION OF THE INVENTION

The following are explanations of each component of the ink transfer medium of this invention.

Figure 1:
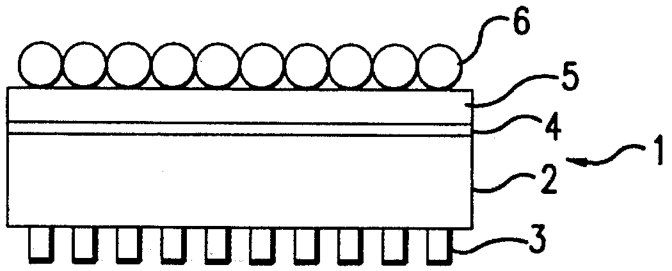
FIG. 1 is a diagrammatical view of an ink transfer medium of this invention.

In FIG. 1, the ink transfer medium 1 comprises the following layers, in this order: an anisotropic conductive layer 3, a heat-generating resistive layer 2, a conductive layer 4, and an ink release layer 5.

The anisotropic conductive layer which reduces the contact resistance between the recording head and the ink transfer medium in the thickness direction and which also reduces heat generation and concomitant damage caused by contact friction with the recording head consists of a fine pattern of isolated electrodes distributed uniformly over the heat-generating resistive layer 2 which acts as a support. Metals such as nickel, copper, chrome, tin, tantalum, titanium, zinc, gold, silver, aluminum, platinum, conductive ceramics such as ruthenium oxide, silicon carbide, tungsten carbide, silicon molybdenum, titanium carbide, or polymers with conductive materials dispersed in them can be used for forming the isolated electrodes. The shape and size of the electrodes can be selected appropriately.

The heat-generating resistive layer conducts the current from the anisotropic conductive layer to the conductive layer and produces heat ohmically, which then fuses the toner of the toner layer. For example, the layer may consist of a conductive material made up of a heat resistant resin with conductive materials such as carbon or metal powder dispersed in it (polyimide resins, polyimideamide resins, silicone resins, fluorine-based resins, epoxy resins, ceramics ) and having a thickness from 0.05 μm to 50 μm, preferably from 0.1 μm to 30 μm.

The conductive layer acts as a return path for the current coming into the heat-generating resistive layer, and it comprises a material whose volume resistivity is from $10^3$ to $10^{-1}$ Ω·cm. The film thickness is generably from 50 nm to 50 μm, preferably from 0.1 μm to 50 μm.

The ink release layer keeps the toner as a uniform thin layer, and it is made of materials capable of releasing the toner when they are fused. The ink release layer of this invention should have a critical surface tension of 35 dyne/cm or less, and an adhesion from 0.2 g/mm to 40 g/mm as measured by the 90° peeling off method.

Conventionally, adhesion is defined by JIS Z 0109 6007 as the force resulting from contact between the adhesive side of an adhesive tape or an adhesive sheet and an object, but for the purpose of this specification, it is regarded as the value of adhesion evaluated by the 90° peeling off method described in JIS Z 0237 as the value of the adhesion between a standard adhesive tape (Nitoflon number 903 available from Nitto Denko Corp.) and an ink release layer.

If the critical surface tension of the ink release layer exceeds 35 dyne/cm, the affinity between the fused toner and the ink release layer is excessive and the release property of the toner declines, and perfect transfer of ink to the recording medium cannot be made. Since the fused toner remain as residual ink in the next process, this causes background fogging caused by new toner overlying old one.

When the adhesion reaches 40 g/mm or more as measured by the 90° peeling off method, as the adhesion of the ink release layer is excessive and toner cannot be released in the interface between the ink release layer and the toner layer, release occurs in the interface between the recording medium and the ink release layer, or as coagulation breakdown occurs in the recording medium and a part of the recording medium is peeled off, the peeled off part adheres to the ink transfer medium. In the worst case, the recording medium may cause a jam instead of being released.

When the value of an adhesion as measured by the 90° peeling off method becomes less than 0.2 g/mm, as the force keeping toner on the ink release layer becomes too low, toner may fall off because of vibration and the like, or background fogging may occur in printing.

Viscoelastomers are used for forming the above described ink release layer of this invention. For example, they may be silicone rubber, liquid type silicone, modified silicone, fluorosilicone rubber, silicone resin, silicone coating agents and the like. The thickness of the ink release layer is from 0.3 μm to 10 μm.

As toner adhering to the ink release layer of the above described ink transfer medium, any known toner can be used if it consists of particles having colorants in a thermally-melting resin and whose average particle diameter is from 2 μm to 20 μm.

Figure 2:
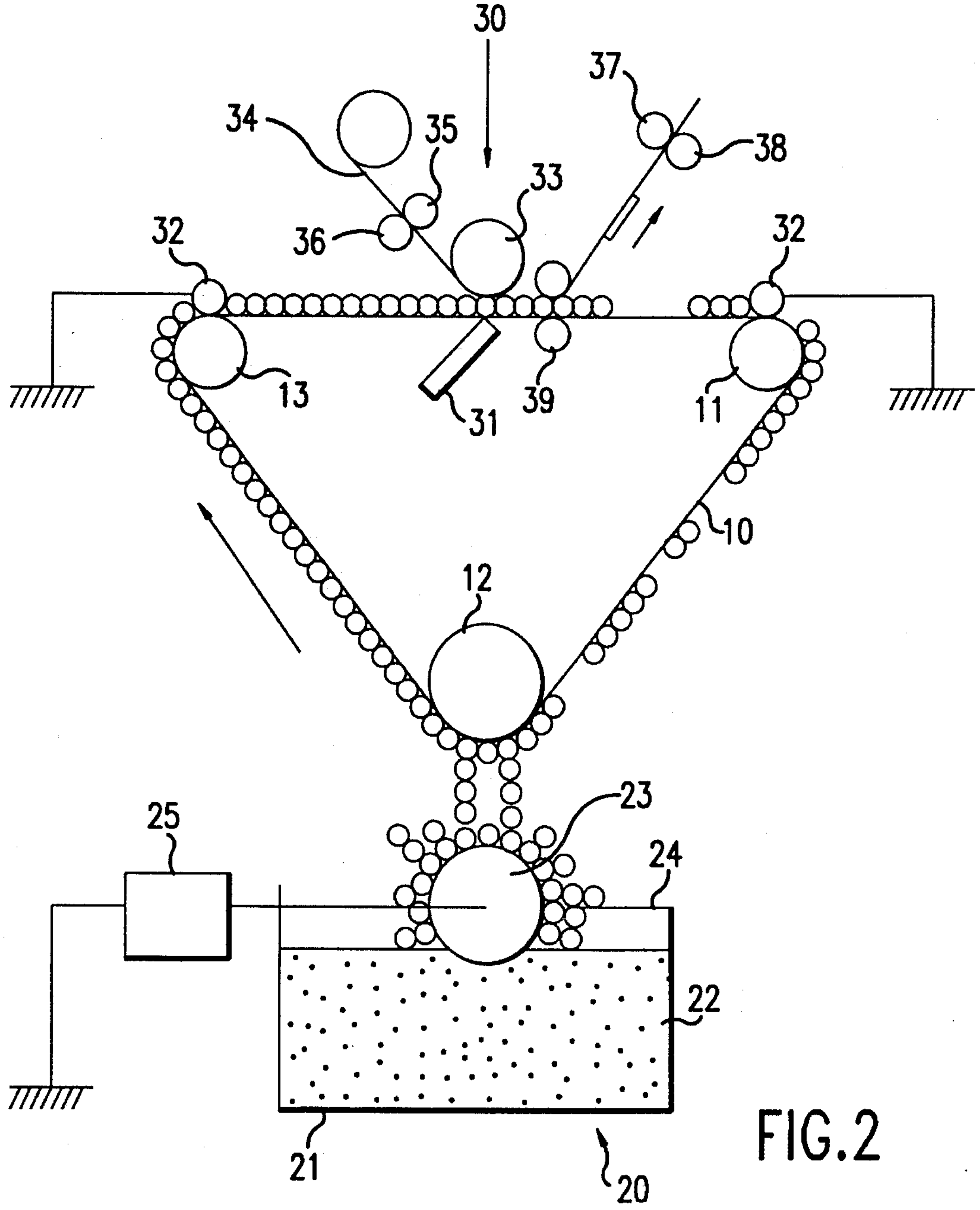
FIG. 2 is a schematic of an example of a printing apparatus used in the ink transfer process for toner of this invention.

An ink transfer process for toner using the above described ink transfer medium is now described, referring to the attached Figures. FIG. 2 is a schematic of an example of a printing apparatus used in the ink transfer process for toner of this invention. In it, 10 is an endless belt type ink transfer medium having toner thereon of the structure shown in FIG. 1, and it is mounted on a carrying roller 11, facing roller 12, and tension roller 13 with a certain tension.

20 is a re-inking apparatus. Toner holding means 23 is positioned in hopper 21, and toner 22 is also kept in hopper 21. Toner holding means 23 is positioned such that it faces facing roller 12 with a specified spacing, and a bias voltage is applied to the toner holding means by a bias electrical source 25. 24 is a toner trimming means.

30 is a recording section, and a recording head 31 which applies an electrical signal corresponding to an image to the heat-generating resistive layer of the ink transfer medium is positioned with the anisotropic conductive layer of the ink transfer medium contacting it. Backing pressure roller 33 is positioned facing the recording head 31 and pressure means 39 is positioned near the recording head. Recording medium 34 is positioned such that it is carried by recording medium carrying rollers 35 to 38. 32 is a return-circuit contact roller which is arranged to be in contact with the electrically conductive portion of the print-recording medium exposed at the side of the former.

When printing is done using the above described ink recording apparatus for toner, the ink transfer medium is carried in the direction of the arrow by driving carrying roller 11. Toner 22 is supplied to the ink release layer of the ink transfer medium and the ink transfer medium with toner on it is carried to the recording section. In the recording section, the recording head applies an electrical signal corresponding to an image to the ink transfer medium with the anisotropic conductive layer contacting it under pressure, and it makes the resistive layer of the ink transfer medium generate heat corresponding to the electrical signal, and then fuse the toner. As a toner layer on the ink transfer medium is carried with the recording medium contacting it under pressure, fused toner is transferred to the recording medium and the transferred image is formed on it. Sufficient contact pressure is necessary, because if the ink transfer medium having toner layer does not contact the recording medium under pressure, the fused toner layer is thinner than non-fused one, and it does not contact the recording medium, which leads to transfer failure.

In this invention, as the ink release layer has the above described structure, when toner is supplied in a re-inking apparatus, the toner adheres to the exposed portions of the ink release layer where toner has been removed by the transfer operation. Since higher layers of toner would not contact the ink release layer, the toner forms a layer with substantially the thickness of a single layer, in another words, with a thickness corresponding to the diameter of the toner particles. In this invention, it is not necessary to level mechanically the toner adhering to the ink release layer by applying heat treatment, and it can form a stable single layer.

Figure 3:
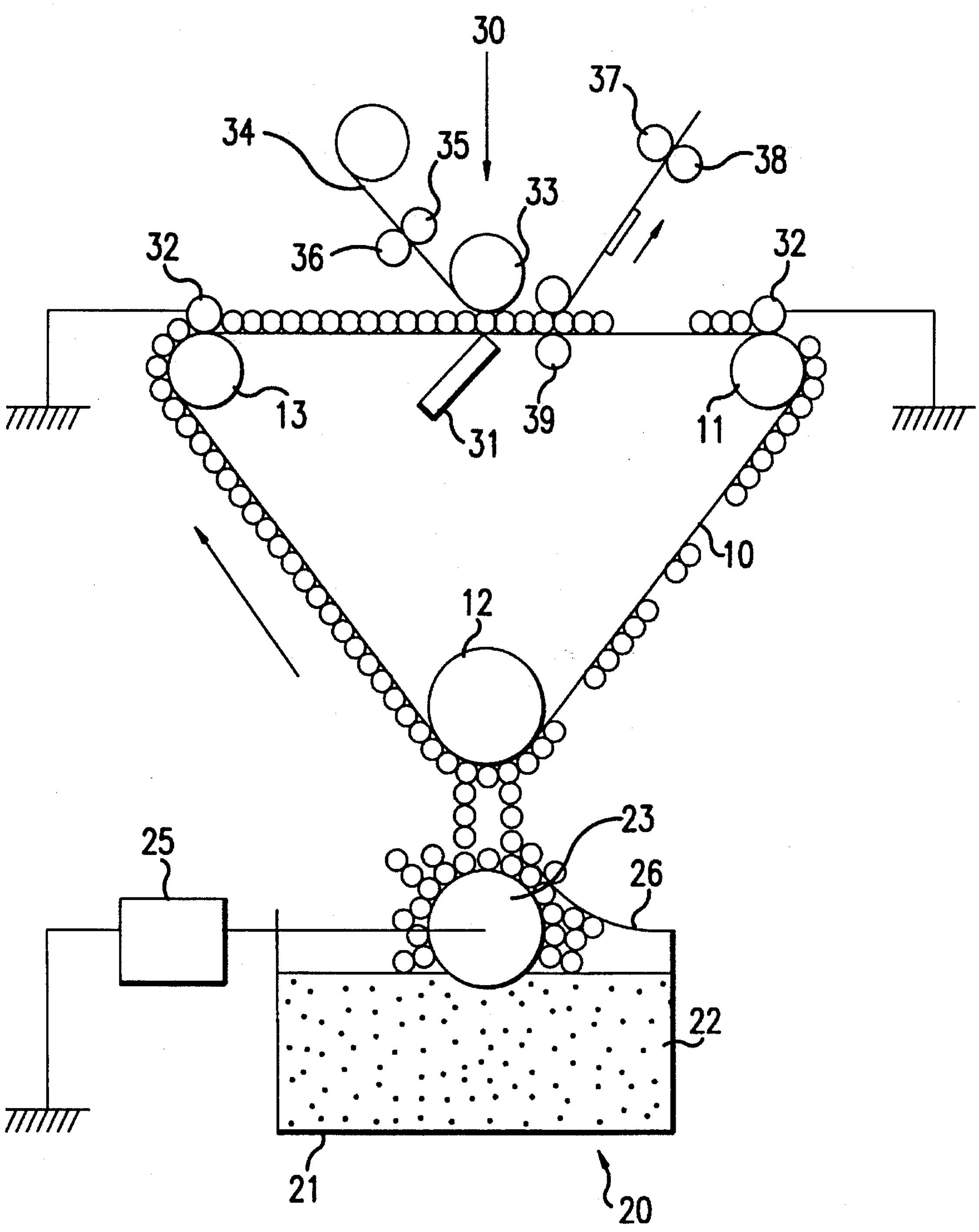
FIG. 3 is a schematic of another example of a printing apparatus used in the ink transfer process for toner of this invention.

FIG. 3 is a schematic of another example of a printing apparatus used in the ink transfer process for toner of this invention. In FIG. 3, a spring blade means having silicone rubber thereon 26 contacts the toner holding means of the re-inking apparatus under pressure, and it controls the supply of toner carried by toner holding means 23, together with giving a required amount of electrical charge to the toner.

Figure 4:
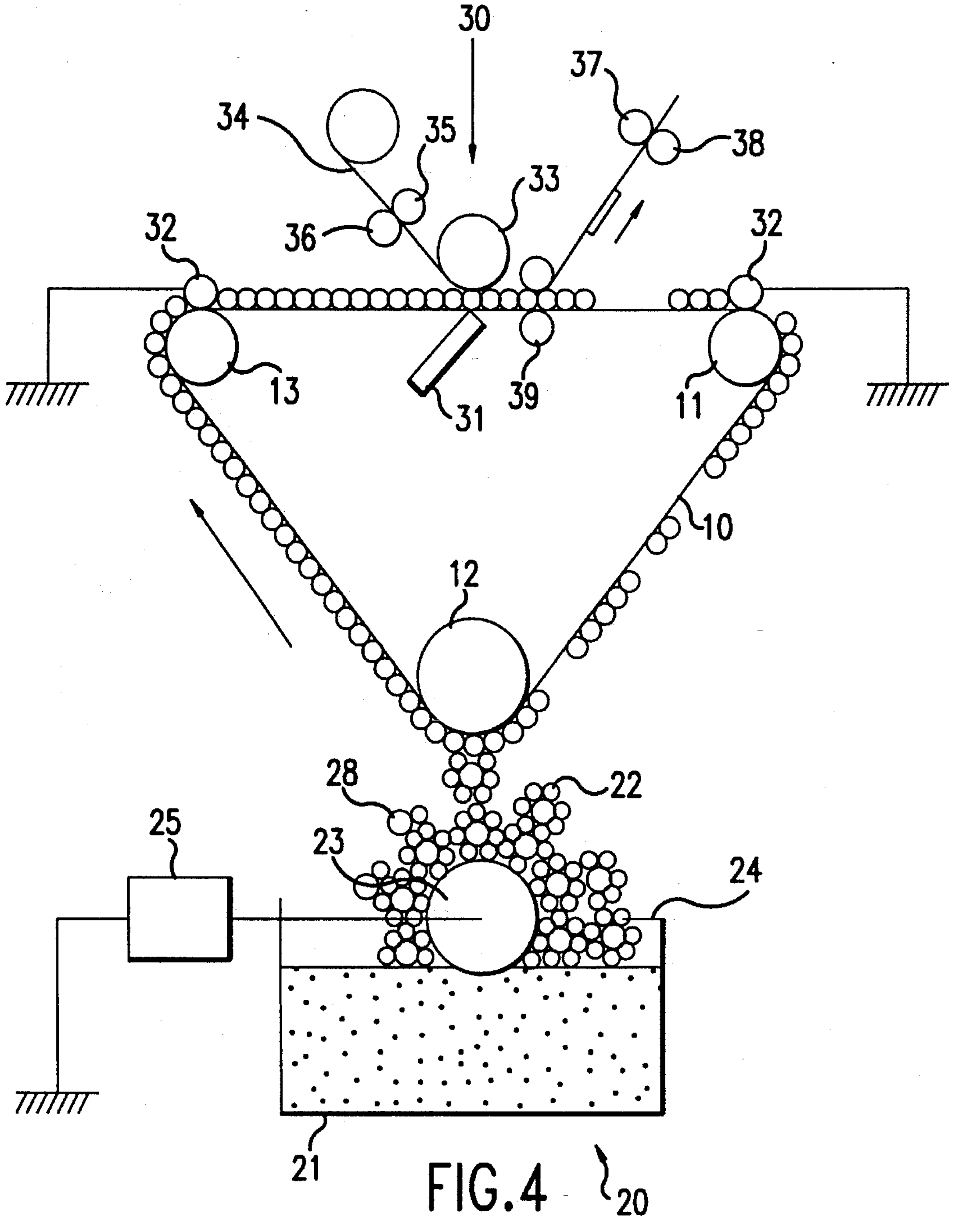
FIG. 4 is a schematic of a further example of a printing apparatus used in the ink transfer process for toner of this invention.

FIG. 4 is a schematic of another example of a printing apparatus used in the ink transfer process for toner of this invention. In the re-inking apparatus of FIG. 4, toner 22 is mixed with electrophotographic carriers 28 by a known stirring apparatus not shown there, is given required amount of electrical charge and then is carried on toner holding means 23 by carriers 28.

Figure 5:
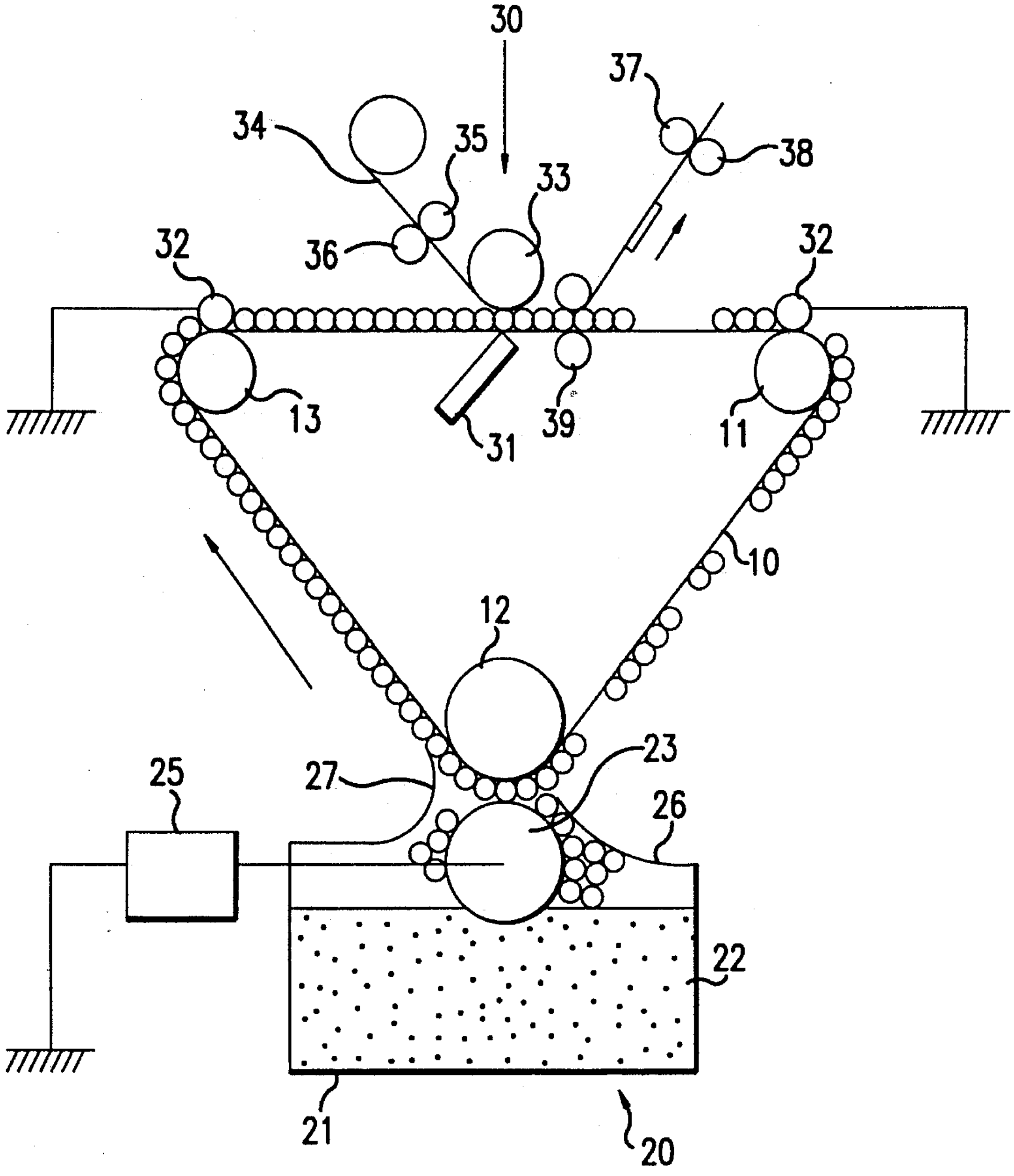
FIG. 5 is a schematic of yet another example of a printing apparatus used in the ink transfer process for toner of this invention.

FIG. 5 is a schematic of another example of a printing apparatus used in the ink transfer process for toner of this invention. In FIG. 5, toner holding means 23 of the re-inking apparatus consists of a spongy roller with a spongy layer such as polyurethane foam formed on a metal shaft, and in this re-inking apparatus, toner is supplied with the spongy roller contacting the ink transfer medium. 26 is a spring blade means having silicone rubber thereon and it controls the toner supply carried on the toner holding means 23. 27 is a flexible blade, and it removes excess toner adhering to the ink transfer medium.

EMBODIMENT 1

Printing was done using the below described ink transfer medium and the ink recording apparatus for toner shown in FIG. 2.

As an ink transfer medium, chromium having a thickness of 0.6 μm was deposited on one side of a conductive polyimide film having a surface resistance value of 550 Ω/□, and a thickness of 30 μm by the high frequency sputtering method. A photoresist was formed on this chromium layer, and a resist film having a film thickness of 1.2 μm was formed after being subject to prebaking at 90° C. for eight minutes. Next, a residual resist film was hardened in a nitrogen atmosphere at 120° C. for eight minutes after optically exposing a circular dot pattern having a spacing of 20 μm and dot diameter of 16 μm on the resist film, developing and rinsing it. Next, an anisotropic conductive layer consisting of a circular dot pattern having a spacing of 20 μm and dot diameter of 16 μm was formed after etching parts of the chromium layer having no resist film on them with hydrochloric acid and removing the resist film by ultrasonic vibration in acetone bath.

Next, an ink release layer having a critical surface tension of 25 dyne/cm and a thickness of 2 μm was formed after depositing aluminum on the other side of this conductive polyimide film with a thickness of 0.3 μm by the high frequency sputtering method and further, applying a thermohardening silicone resin having a volume resistivity of $10^{14}$ Ω·cm(KR2706 available from Shin-Etsu Chemical Industry Co. Ltd.) over the film except both edges and hardening the film at 150° C. for 30 minutes. When adhesion was measured for this ink release layer using a standard adhesive tape (Nitoflon number 903 available from Nitto Denko Corp.) and by the 90° peeling off method described in JIS Z 0237, it was 4 g/mm. Next, an endless belt type ink transfer medium was obtained by joining the ends of the polyimide film with the anisotropic conductive layer inside.

A toner layer was formed on this ink transfer medium as follows.

Particles having a volume average particle diameter of 10 μm were obtained by mixing 60 parts by weight of polyester resin and 40 parts by weight of magnetic powder as toner, applying heat and kneading, pulverizing by jet mill and classifying them, as is well-known in the art. The toner was prepared by mixing 97 parts by weight of these particles and 3 parts by weight of carbon black using a Henschel mixer. When 10 g of this toner was molded by pressure forming into a disk having a diameter of 5 cm and a thickness of 2.5 mm, its volume resistivity was found to be $10^3$ Ω·cm.

An electrophotographic magnet roller was used as a toner holding means in the re-inking apparatus and it was positioned with a spacing of 0.4 mm from the above described ink transfer medium. Further, a toner layer consisting of substantially a single particle layer was formed by rotating the toner holding means in the forward direction of the ink transfer medium at a linear velocity of 250 mm/s, applying a bias voltage of 50 V to the toner holding means, and supplying the above described toner to the ink transfer medium. Printing was done by rotating an ink transfer medium with toner adhering to it as described above at a linear velocity of 100 mm/s, making it contact the recording medium under a backing pressure roller, making the recording head having a resolution of 400 spot per inch contact the anisotropic conductive layer of the ink transfer medium under pressure, applying a pulse of 20 mA to the recording head for 600 μs, fusing the toner, having the ink transfer medium with the recording medium adhering to it pass a pressure means consisting of a pair of rubber rollers and releasing them from the ink transfer medium. The toner transfer rate was 98% and the printing image optical density was measured as 1.6. On the other hand, fogging which was considered to be a practical problem did not occur on the non-printed part.

After printing, re-inking was done by attaching toner to the places where ink had been transferred on the above described ink transfer medium in the same manner as described above. The toner transfer rate and the printing image optical density were measured after repeating the above described process 100 times. When measured, the toner transfer rate was 96% and the printing image optical density was 1.5. Fogging which was considered to be a practical problem did not occur on the non-printed part.

EMBODIMENT 2

An ink transfer medium was prepared in the same manner as Embodiment 1 except that the ink release layer had a critical surface tension of 30 dyne/cm, a thickness of 3 μm and an adhesion of 28 g/mm after applying a thermohardening silicone low-adhesion agent having a volume resistivity of $10^{14}$ Ω·cm or more instead of a thermohardening silicone resin having a volume resistivity of $10^{14}$ Ω·cm or more as an ink release layer, thermally hardening it at 100° C. for 3 minutes. Toner adhered to the ink transfer medium and printing was done in the same manner as in Embodiment 1 except using this ink transfer medium, making the bias voltage of the toner holding means 70 V and applying a pulse of 25 mA to it. When measured, the toner transfer rate was 95% and the printing image optical density was 1.4. Fogging which was considered to be a practical problem did not occur on the non-printed part. After printing, re-inking was done by attaching toner to the places where ink had been transferred on the above described ink transfer medium in the same manner as described above. The toner transfer rate and the printing image optical density were measured after repeating the above described process 100 times. The toner transfer rate was 94% and the printing image optical density was 1.3. Fogging which was considered to be a practical problem did not occur on the non-printed part.

EMBODIMENT 3

Printing was done using the ink recording apparatus for toner shown in FIG. 3. In more detail, it was done by using the same toner and the same electrophotographic magnet roller as toner holding means as in Embodiment 1 except that 0.8 parts by weight of silica particles were mixed with the toner instead of carbon black, pressing a spring blade means composed of SUS303 having silicone rubber thereon and having a thickness of 0.1 mm against the toner holding means surface with a linear pressure of 100 g/cm such that the amount of toner supplied to the toner holding means surface was controlled and an electrical charge of −5 μC/g was added to the toner.

A toner layer consisting of substantially a single particle layer was formed by positioning this toner holding means and the same ink transfer medium as in Embodiment 1 at a spacing of 0.3 mm, rotating the toner holding means in the forward direction of the ink transfer medium at a linear velocity of 200 mm/s, applying an AC voltage with a DC voltage of +400 V superimposed on it and having an amplitude of 1000 V and a frequency of 2 $kH_z$ as a bias voltage, supplying and attaching the above described toner to the ink transfer medium.

When the toner transfer rate and the printing image optical density were measured after printing was done in the same manner as in Embodiment 1, using an ink transfer medium with toner adhering to it as described above, the toner transfer rate was 97% and the printing image optical density was 1.7. On the other hand, fogging which was considered to be a practical problem did not occur on the non-printed part.

After printing, re-inking was done by attaching toner to the places where ink had been transferred on the above described ink transfer medium in the same manner as described above. The toner transfer rate and the printing image optical density were measured after repeating the above described process 100 times. The toner transfer rate was 96% and the printing image optical density was 1.6. Fogging which was considered to be a practical problem did not occur on the non-printed part.

EMBODIMENT 4

Printing was done using the ink recording apparatus for toner shown in FIG. 4. In more detail, particles having a volume average particle diameter of 7 μm were obtained after mixing 93 parts by weight of polyester resin and 7 parts by weight of carbon black as toner, and applying processes of fusing and kneading, pulverizing by jet mill and classifying, as is well-known in the art. Further, toner was prepared after mixing 99.2 parts by weight of this particle and 0.8 parts by weight of silica particles using a Henschel mixer. A developer having a triboelectrification value of −12 μC/g was prepared by mixing 92 parts by weight of electrophotographic carrier particles having a volume average particle diameter of 50 μm and 8 parts by weight of the above described toner. A toner layer consisting of substantially a single particle layer was formed by supplying the above described toner agent to the same ink transfer medium and attaching only toner to it in the same manner as in Embodiment 1 except applying an AC voltage with a DC voltage of +500 V superimposed on it and having an amplitude of 1000 V and a frequency of 2 $kH_z$ as a bias voltage.

When the toner transfer rate and the printing image optical density were measured after printing was done in the same manner as in Embodiment 1, using an ink transfer medium with toner adhering to it as described above, the toner transfer rate was 98% and the printing image optical density was 1.7. On the other hand, fogging which was considered to be a practical problem did not occur on the non-printed part.

After printing, re-inking was done by attaching toner to the places where ink had been transferred on above described ink transfer medium in the same manner as described above. The toner transfer rate and the printing image optical density were measured after repeating the above described process 100 times. The toner transfer rate was 96% and the printing image optical density was 1.6. Fogging which was considered to be a practical problem did not occur on the non-printed part.

EMBODIMENT 5

Printing was done using the same ink transfer medium as in Embodiment 1 and the ink recording apparatus for toner shown in FIG. 5. In more detail, particles having a volume average particle diameter of 10 μm were obtained after mixing 95 parts by weight of polyester resin and 5 parts by weight of cyan pigment as toner, applying processes of fusing and kneading, pulverizing by jet mill and classifying them, as is well-known in the art, using the same ink transfer medium as in Embodiment 1. Further, toner was prepared after mixing 94 parts by weight of these particles and 6 parts by weight of titanium oxide powder using a Henschel mixer. When 5 g of these toner particles were molded by pressure forming into a disk having a diameter of 5 cm and a thickness of 2.5 mm, its volume resistivity was found to be $10^5$ Ω·cm.

A spongy roller with a polyurethane foam layer having an apparent specific gravity of $3\times10^{-2}$ g/cm$^3$ and a volume resistivity of $10^8$ Ω·cm formed on it was used as a toner holding means in a re-inking apparatus. Toner supplied to the toner holding means surface was controlled by pressing a spring blade means composed of SUS303 having silicone rubber thereon and having a thickness of 0.1 mm to this toner holding means with a linear pressure of 50 g/cm. The above described toner was supplied and attached to the ink transfer medium by making this toner holding means contact the above described ink transfer medium, rotating the toner holding means in the forward direction of the ink transfer medium at a linear velocity of 250 mm/s, applying a bias voltage of 150 V to the toner holding means, and supplying and adhering the above described toner to the ink transfer medium. Further, a toner layer consisting of substantially a single particle layer was formed by removing excessive toner by a flexible blade.

Printing was done by using the ink transfer medium with toner adhering to it as described above in the same manner as in Embodiment 1. The toner transfer rate was 98% and the printing image optical density was measured as 1.4. On the other hand, fogging which was considered to be a practical problem did not occur on the non-printed part. After printing, re-inking was done by attaching toner to the places where ink had been transferred on the above described ink transfer medium in the same manner as described above. The toner transfer rate and the printing image optical density were measured after repeating the above described process 100 times. The toner transfer rate was 97% and the printing image optical density was 1.4. Fogging which was considered to be a practical problem did not occur on the non-printed part.

COMPARATIVE EMBODIMENT 1

An ink transfer medium was prepared in the same manner as Embodiment 1 except forming an ink release layer having a critical surface tension of 25 dyne/cm, a thickness of 2 μm, an adhesion of 0.12 g/mm by applying a thermohardening silicone resin having a volume resistivity of $10^{14}$ Ω·cm or more (KS-779H available from Shin-Etsu Chemical Industry Co. Ltd.) and thermally hardening it at 150° C. for a minute. Printing was done using this ink transfer medium and attaching toner to it in the same manner as in Embodiment 1. When measured, the toner transfer rate was 97% and the printing image optical density was 1.5. Fogging which was considered to be a practical problem occurred on the non-printed part.

COMPARATIVE EMBODIMENT 2

An ink transfer medium was prepared in the same manner as Embodiment 1 except forming an ink release layer having a critical surface tension of 38 dyne/cm, a thickness of 3 μm, an adhesion of 32 g/mm by applying a thermohardening silicone resin and thermally hardening it at 150° C. for three minutes. Printing was done in the same manner as Embodiment 1 except using this ink transfer medium, making the bias voltage of the toner holding means 70 V and applying a pulse of 25 mA to it. When measured, the toner transfer rate was 68% and the printing image optical density was 1.0, and fused toner remained on the ink transfer medium. Re-inking and printing were done again in the same manner as in Embodiment 1, and fogging which was considered to be a practical problem occurred in the places where there had been a printed image in the previous cycle.

COMPARATIVE EMBODIMENT 3

An ink transfer medium was prepared in the same manner as Embodiment 1 except forming an ink release layer having a critical surface tension of 30 dyne/cm, a thickness of 3 μm, an adhesion of 6 g/mm by applying a thermohardening silicone rubber having a volume resistivity of $10^{14}$ Ω·cm or more (KE1820 available from Shin-Etsu Chemical Industry Co., Ltd.) and thermally hardening it at 150° C. for three minutes. Attaching toner to the ink transfer medium and printing were done in the same manner as Embodiment 1 except using this ink transfer medium, making the bias voltage of the toner holding means 70 V and applying a pulse of 25 mA to it. Releasing of the recording medium from the ink transfer medium, however, could not be done, and as jams occurred, the experiment was abandoned.

What is claimed is:

1. An ink transfer medium for toner comprising the following layers, in this order:

a heat-generating resistive layer heated by input of an electrical signal;

an anisotropic conductive layer;

and an ink release layer having an adhesion from 0.2 g/mm to 40 g/mm, the ink release layer including an viscoelastomer having a critical surface tension of 35 dynes/cm or less, a toner layer consisting of toner held on the ink release layer, wherein the toner layer comprises particles having colorants in a thermally-melting resin and an average particle diameter of from 2 to 20 microns.

2. The ink transfer medium of claim 1, wherein the viscoelastomer is silicone rubber, liquid silicone, modified silicone, fluorosilicone rubber, silicone resin or a silicone coating agent.

3. The ink transfer medium of claim 1, wherein the toner layer comprises particles containing polyester resin and magnetic powder.

4. The ink transfer medium of claim 1, wherein the toner layer additionally comprises carbon black.

5. The ink transfer medium of claim 1, wherein the toner layer comprises a single particle layer in thickness.

6. The ink transfer medium of claim 1, where in the toner layer comprises particles containing polyester resin and carbon black.

7. The ink transfer medium of claim 6, wherein the toner layer comprises carbon black addition to said particles.

* * * * *